United States Patent
Tsuchida et al.

(10) Patent No.: US 10,972,173 B2
(45) Date of Patent: Apr. 6, 2021

(54) WIRELESS COMMUNICATION DEVICE

(71) Applicant: TOSHIBA TEC KABUSHIKI KAISHA, Tokyo (JP)

(72) Inventors: Sunao Tsuchida, Mishima Shizuoka (JP); Hiroyuki Ishikawa, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/458,299

(22) Filed: Jul. 1, 2019

(65) Prior Publication Data

US 2020/0067594 A1  Feb. 27, 2020

(30) Foreign Application Priority Data

Aug. 24, 2018  (JP) ............... JP2018-157167

(51) Int. Cl.
  *H04B 7/155* (2006.01)
  *H04L 12/733* (2013.01)
  *H04W 84/18* (2009.01)

(52) U.S. Cl.
  CPC ..... *H04B 7/15542* (2013.01); *H04B 7/15521* (2013.01); *H04L 45/20* (2013.01); *H04W 84/18* (2013.01)

(58) Field of Classification Search
  None
  See application file for complete search history.

(56) References Cited

U.S. PATENT DOCUMENTS

| | | | |
|---|---|---|---|
| 8,693,399 B2 | 4/2014 | Hirata et al. | |
| 9,307,558 B2 | 4/2016 | Flammer, III | |
| 10,484,925 B1* | 11/2019 | Chen | H04W 48/10 |
| 2005/0111428 A1 | 5/2005 | Orlik et al. | |
| 2005/0195814 A1 | 9/2005 | Hagiwara et al. | |
| 2008/0194201 A1* | 8/2008 | Sinivaara | H04W 52/0216 |
| | | | 455/41.2 |
| 2012/0042000 A1* | 2/2012 | Heins | G06Q 10/10 |
| | | | 709/201 |
| 2018/0211238 A1 | 7/2018 | Ishikawa et al. | |

FOREIGN PATENT DOCUMENTS

| | | |
|---|---|---|
| JP | 2006-191519 | 7/2006 |
| JP | 2018-36981 | 3/2018 |

OTHER PUBLICATIONS

Extended European Search Report for European Patent Application No. 19192244.2 dated Nov. 22, 2019.

* cited by examiner

*Primary Examiner* — Saumit Shah

(74) *Attorney, Agent, or Firm* — Amin, Turocy & Watson, LLP

(57) ABSTRACT

In accordance with an embodiment, a wireless communication device constituting a wireless mesh network that transmits information through multi-hop communication comprises a communication section configured to transmit a message addressed to a wireless communication device different from its own wireless communication device through broadcast communication on a first frequency channel; and a control section configured to change a communication channel of the communication section from the first frequency channel to a second frequency channel for communication of a response signal responding to the message after the message is transmitted by the communication section.

13 Claims, 10 Drawing Sheets

(a)

| TERMINAL | ADDRESS | FREQUENCY CHANNEL |
|---|---|---|
| POS TERMINAL 100 | 0100 | chA→chB |
| POS TERMINAL 110 | 0110 | chA |
| POS TERMINAL 120 | 0120 | chA |
| POS TERMINAL 130 | 0130 | chA |
| POS TERMINAL 140 | 0140 | chA |
| POS TERMINAL 150 | 0150 | chA |
| GATEWAY | 0200 | chA |

(b)

| DESTINATION | TRANSMISSION SOURCE | FINAL DESTINATION | DATA | TRANSFER HISTORY |
|---|---|---|---|---|
| FFFF | 0100 | 0200 | Data | — |

(c)

(a)

| TERMINAL | ADDRESS | FREQUENCY CHANNEL |
|---|---|---|
| POS TERMINAL 100 | 0100 | chB |
| POS TERMINAL 110 | 0110 | chA→chB |
| POS TERMINAL 120 | 0120 | chA |
| POS TERMINAL 130 | 0130 | chA |
| POS TERMINAL 140 | 0140 | chA |
| POS TERMINAL 150 | 0150 | chA |
| GATEWAY | 0200 | chA |

(b)

| DESTINATION | TRANSMISSION SOURCE | FINAL DESTINATION | DATA | TRANSFER HISTORY |
|---|---|---|---|---|
| FFFF | 0100 | 0200 | Data | 0110 |

(c)

(a)

| TERMINAL | ADDRESS | FREQUENCY CHANNEL |
|---|---|---|
| POS TERMINAL 100 | 0100 | chB |
| POS TERMINAL 110 | 0110 | chB |
| POS TERMINAL 120 | 0120 | chA |
| POS TERMINAL 130 | 0130 | chA→chB |
| POS TERMINAL 140 | 0140 | chA |
| POS TERMINAL 150 | 0150 | chA |
| GATEWAY | 0200 | chA |

(b)

| DESTINATION | TRANSMISSION SOURCE | FINAL DESTINATION | DATA | TRANSFER HISTORY |
|---|---|---|---|---|
| FFFF | 0100 | 0200 | Data | 0130 |

(c)

(a)

| TERMINAL | ADDRESS | FREQUENCY CHANNEL |
|---|---|---|
| POS TERMINAL 100 | 0100 | chB |
| POS TERMINAL 110 | 0110 | chB |
| POS TERMINAL 120 | 0120 | chA→chB |
| POS TERMINAL 130 | 0130 | chB |
| POS TERMINAL 140 | 0140 | chA |
| POS TERMINAL 150 | 0150 | chA |
| GATEWAY | 0200 | chA→chB |

(b)

| DESTINATION | TRANSMISSION SOURCE | FINAL DESTINATION | DATA | TRANSFER HISTORY |
|---|---|---|---|---|
| FFFF | 0100 | 0200 | Data | 0110,0120 |

(c)

(a)

| TERMINAL | ADDRESS | FREQUENCY CHANNEL |
|---|---|---|
| POS TERMINAL 100 | 0100 | chB |
| POS TERMINAL 110 | 0110 | chB |
| POS TERMINAL 120 | 0120 | chB |
| POS TERMINAL 130 | 0130 | chB |
| POS TERMINAL 140 | 0140 | chA |
| POS TERMINAL 150 | 0150 | chA |
| GATEWAY | 0200 | chB→chA |

(b)

| DESTINATION | TRANSMISSION SOURCE | DATA | TRANSFER INFORMATION |
|---|---|---|---|
| 0120 | 0200 | ACK | 0200,0120,0110,0100 |

(c)

(a)

| TERMINAL | ADDRESS | FREQUENCY CHANNEL |
|---|---|---|
| POS TERMINAL 100 | 0100 | chB |
| POS TERMINAL 110 | 0110 | chB |
| POS TERMINAL 120 | 0120 | chB→chA |
| POS TERMINAL 130 | 0130 | chB |
| POS TERMINAL 140 | 0140 | chA |
| POS TERMINAL 150 | 0150 | chA |
| GATEWAY | 0200 | chA |

(b)

| DESTINATION | TRANSMISSION SOURCE | DATA | TRANSFER INFORMATION |
|---|---|---|---|
| 0110 | 0120 | ACK | 0200,0120,0110,0100 |

(c)

(a)

| TERMINAL | ADDRESS | FREQUENCY CHANNEL |
|---|---|---|
| POS TERMINAL 100 | 0100 | chB→chA |
| POS TERMINAL 110 | 0110 | chB→chA |
| POS TERMINAL 120 | 0120 | chA |
| POS TERMINAL 130 | 0130 | chB |
| POS TERMINAL 140 | 0140 | chA |
| POS TERMINAL 150 | 0150 | chA |
| GATEWAY | 0200 | chA |

(b)

| DESTINATION | TRANSMISSION SOURCE | DATA | TRANSFER INFORMATION |
|---|---|---|---|
| 0100 | 0110 | ACK | 0200,0120,0110,0100 |

| DESTINATION | TRANSMISSION SOURCE | FINAL DESTINATION | DATA | CHANNEL | TRANSFER HISTORY |
|---|---|---|---|---|---|
| FFFF | 0100 | 0200 | Data | Ch B | — |

US 10,972,173 B2

WIRELESS COMMUNICATION DEVICE

CROSS-REFERENCE TO RELATED APPLICATION

This application is based upon and claims the benefit of priority from Japanese Patent Application No. 2018-157167, filed in Aug. 24, 2018, the entire contents of which are incorporated herein by reference.

FIELD

Embodiments described herein relate generally to a wireless communication device constituting a portion of a wireless mesh network.

BACKGROUND

In a retail store such as a supermarket, a POS (Point Of Sales) terminal is used. Since the POS terminal executes various processing relating to a transaction, a high reliability is required, and maintenance and management become important for the POS terminal. As a maintenance and management method, for example, a method for constructing a mesh network among a plurality of POS terminals to transmit information relating to maintenance is considered.

A method of performing broadcast communication by adding its own address to a header of a message in the mesh network is known. In such a method, a node that receives the message similarly adds its own address, repeats the broadcast communication, and then transmits the message to a target node. The target node refers to the addresses stored in the header to transfer a reply to the node which is a transmission source in reverse.

DESCRIPTION OF THE DRAWINGS

FIG. 11 is a diagram illustrating a configuration of a data packet according to a modification of the embodiment.

DETAILED DESCRIPTION

In accordance with an embodiment, a wireless communication device constituting a portion of a wireless mesh network that transmits information through multi-hop communication comprises a communication section configured to transmit a message addressed to a wireless communication device different from its own wireless communication device through broadcast communication on a first frequency channel; and a control section configured to change a communication channel of the communication section from the first frequency channel to a second frequency channel for communication of a response signal responding to the message after the message is transmitted by the communication section.

Embodiments are described below with reference to the accompanying drawings.

Figure 1:
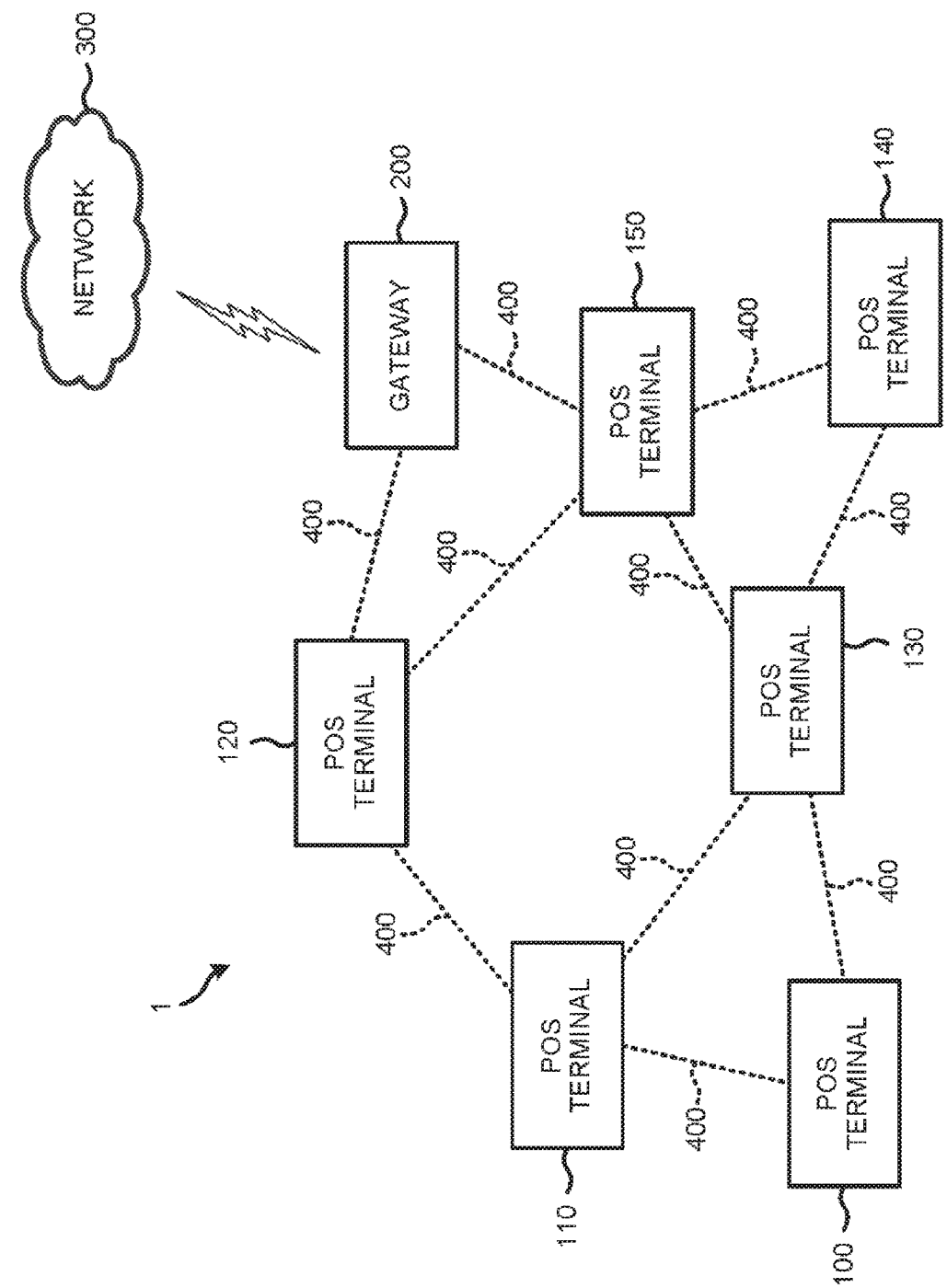
FIG. 1 is a diagram illustrating a maintenance network system according to an embodiment.

FIG. 1 is a diagram illustrating a configuration of a maintenance network system 1 composed of a POS terminal.

The maintenance network system 1 includes POS terminals 100 to 150, and a gateway 200. The "terminal" can also be read as a "device".

Each of the POS terminals 100 to 150 wirelessly communicates with one or more adjacent POS terminals or the gateway 200 via a wireless mesh network 400. The POS terminals 100 to 150 constitute a wireless mesh network that transmits information (signals) through multi-hop communication. Each of the POS terminals 100 to 150 is merely an example of a wireless communication device.

The number of POS terminals constituting the maintenance network system 1 is not limited to six as shown in FIG. 1, and may be increased or decreased as appropriate. Hereinafter, if at least any one of the POS terminals 100 to 150 is mentioned, it is simply referred to as a "POS terminal".

The gateway 200 wirelessly communicates with one or more adjacent POS terminals via the wireless mesh network 400. The gateway 200 is connected to a network 300 through communication such as LTE (registered trademark) (Long Term Evolution) communication or wireless LAN (Local Area Network). The gateway 200 transfers information (e.g., maintenance information) from the POS terminal to the network 300. The gateway 200 may transmit information from the network 300 to the POS terminal. The gateway 200 constitutes the wireless mesh network 400 that transmits the information through multi-hop communication. The gateway 200 is an example of the wireless communication device.

The network 300 transmits information to other terminals. For example, the network 300 is the Internet.

The wireless mesh network 400 has a network configuration in which POS terminals and gateways 200 arranged in proximity communicate with each other to form a mesh communication line. For example, the POS terminals 100 to 150 and the gateway 200 are connected through wireless communication in sub-GHz band in conformity with the IEEE 802.15.4g International Standard.

Next, a configuration of the POS terminal 100 is described.

Figure 2:
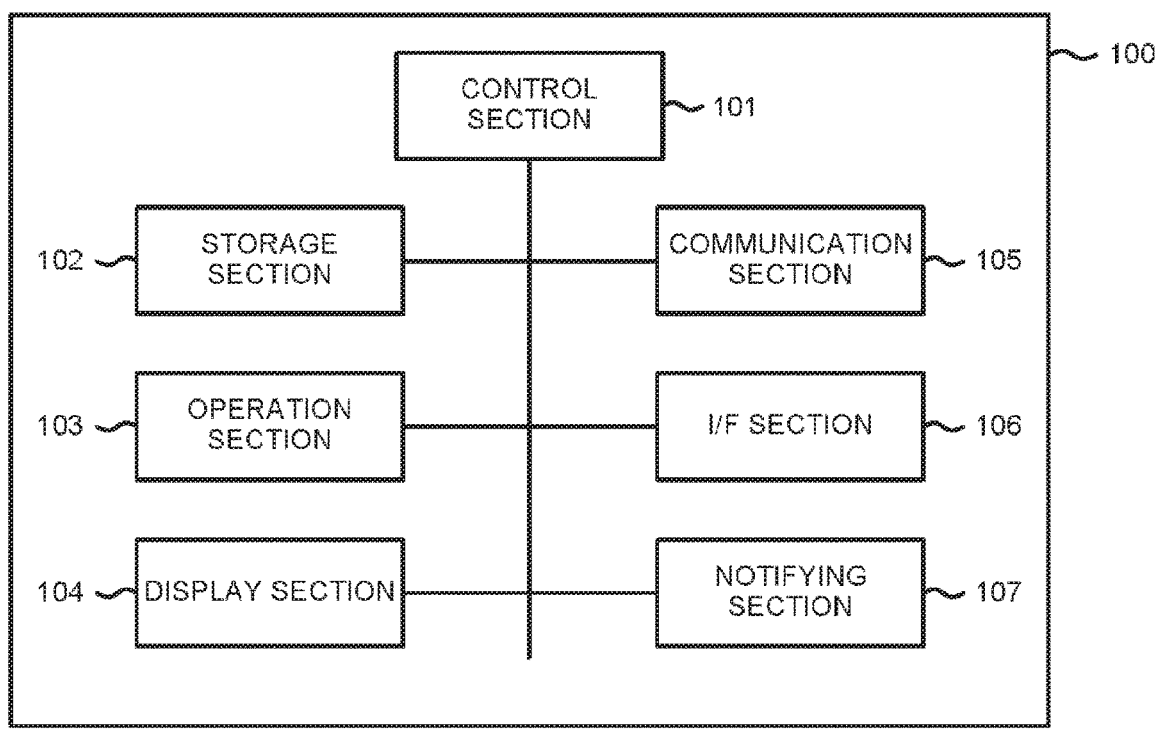
FIG. 2 is a hardware block diagram illustrating a hardware structure of a POS terminal according to the embodiment.

FIG. 2 is a hardware block diagram illustrating a hardware structure of the POS terminal 100.

The POS terminal 100 includes a control section 101, a storage section 102, an operation section 103, a display section 104, a communication section 105, an I/F (interface)

section 106 and a notifying section 107. These sections are connected to one another via a data bus. The POS terminal 100 may further include a component as required in addition to components shown in FIG. 2, or may exclude a specific component.

The control section 101 has a function of controlling an overall operation of the POS terminal 100. The control section 101 includes a CPU (Central Processing Unit), a ROM (Read Only Memory) and a RAM (Random Access Memory). The CPU collectively controls the operations of the POS terminal 100. The ROM stores various programs and various kinds of data. The RAM temporarily stores various programs, and stores data necessary for executing an application program, an execution result, and the like. Then, the CPU executes a program stored in the ROM or the storage section 102 using the RAM as a work area.

The control section 101 transmits a data packet via the communication section 105 to another POS terminal or the gateway 200 connected through the wireless mesh network 400. The data packet includes data such as the maintenance information stored in the storage section 102. For example, the maintenance information includes version information, error information and repair information of a program. The data packet is also referred to as a message. Furthermore, the control section 101 processes the data packet or other packets received via the communication section 105 from another POS terminal or the gateway 200 connected through the wireless mesh network 400.

The storage section 102 is an HDD (Hard Disk Drive), an SSD (Solid State Drive) or the like. The storage section 102 stores a control program, the maintenance information and address information of its own POS terminal for the use in the communication through the wireless mesh network 400.

The operation section 103 is operated by an operator of the POS terminal 100 to input various operation instructions. The operation section 103 transmits a signal indicating the operation instruction input by the operator to the control section 101. For example, the operation section 103 is a keyboard, a touch panel, or the like.

The display section 104 displays various kinds of information under the control of the control section 101. For example, the display section 104 is a liquid crystal monitor or the like. In a case in which the operation section 103 is a touch panel, the display section 104 may be integrally formed with the operation section 103.

The communication section 105 is an interface for establishing communication with another POS terminal and the gateway 200 connected through the wireless mesh network 400. The communication section 105 transmits a predetermined data packet or other packets to another POS terminal or the gateway 200 in response to the signal from the control section 101. The communication section 105 transmits the data packet or other packets received from another POS terminal or the gateway 200 to the control section 101.

Based on the signal from the control section 101, one communication channel selected from a plurality of communication channels with different frequencies is set in the communication section 105. The communication section 105 does not transmit and receive a signal of a communication channel other than the set communication channel. Specifically, if the communication channel set in the communication section 105 is different from that set in a communication section of another POS terminal, the communication is not established.

For example, the communication section 105 supports wireless communication in sub-GHz band in conformity with the IEEE 802.15.4g International Standard, or the wireless LAN.

The I/F section 106 is connected with a peripheral device such as a scanner, a printer or the like. The connection with the peripheral device may be wired connection or wireless connection. The wired connection is a USB (Universal Serial Bus) connection. The wireless connection is connection based on a wireless LAN or Bluetooth® Technology. The I/F section 106 may conform to the same wireless communication standard as the communication section 105 does. In that case, the communication section 105 and the I/F section 106 may have a common configuration.

The notifying section 107 notifies an operator of a state of the POS terminal 100 in response to the signal from the control section 101. For example, the notifying section 107 is an LED (Light Emitting Diode) or a speaker.

The POS terminal 110, the POS terminal 120, the POS terminal 130, the POS terminal 140 and the POS terminal 150 have the same configuration as the POS terminal 100.

Next, a hardware structure of the gateway 200 is described.

Figure 3:
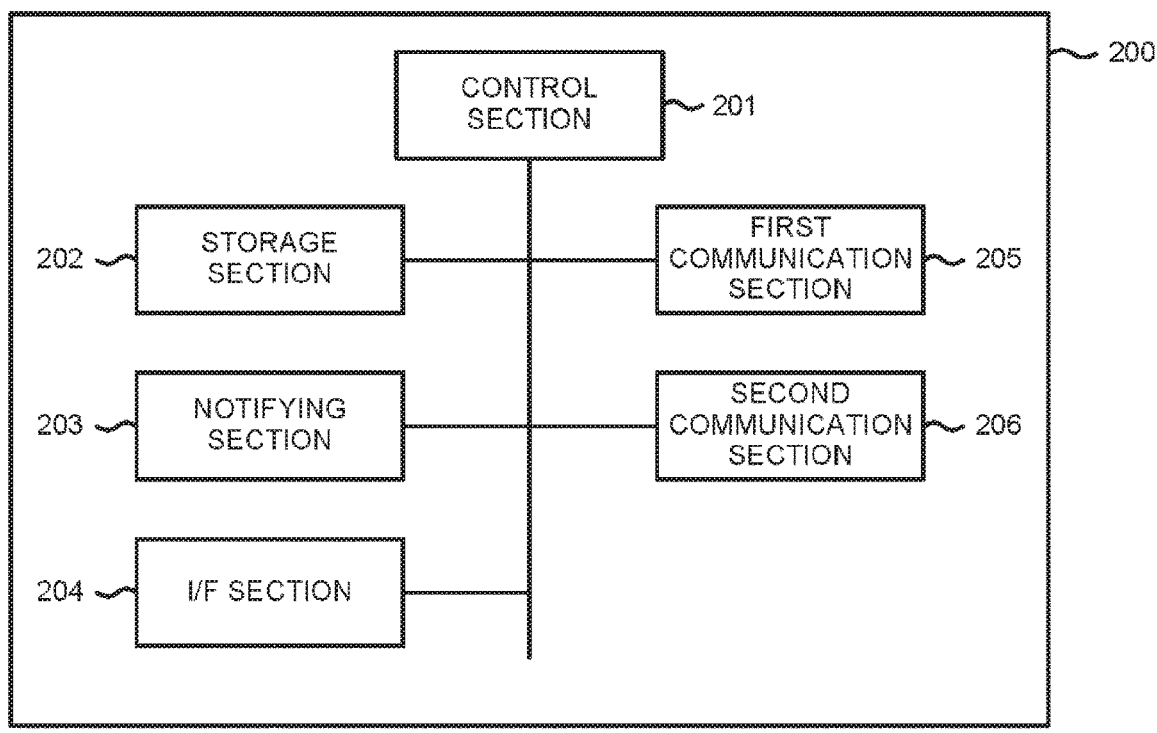
FIG. 3 is a hardware block diagram illustrating an example of a hardware structure of a gateway according to the embodiment.

FIG. 3 is a hardware block diagram illustrating a hardware structure of the gateway 200.

The gateway 200 includes a control section 201, a storage section 202, a notifying section 203, an I/F section 204, a first communication section 205 and a second communication section 206. These sections are connected to one another via a data bus. The gateway 200 may further include a component in addition to the components shown in FIG. 3, or may exclude a specific configuration.

The control section 201 has a function of controlling an overall operation of the gateway 200. The control section 201 includes a CPU, a ROM and a RAM. The CPU collectively controls the operations of the gateway 200. The ROM stores various programs and various kinds of data. The RAM temporarily stores various programs, and stores data necessary for executing an application program, an execution result, and the like. Then, the CPU executes a program stored in the ROM or the storage section 202 using the RAM as a work area.

The control section 201 processes data packet received by the first communication section 205 as necessary, and then transmits the processed data packet from the second communication section 206. In this example, the control section 201 erases a header such as address information included in the data packet received by the first communication section 205. Then, the control section 201 processes the data packet in accordance with a data format for transmission by the second communication section 206 and then transmits the processed data packet.

The control section 201 processes data packet received by the second communication section 206 as necessary, and transmits the processed data packet from the first communication section 205. In this example, the control section 201 interprets the data packet received by the second communication section 206. Then, the control section 201 processes the data packet in accordance with a data format for transmission by the first communication section 205 and transmits the processed data packet.

The storage section 202 is an HDD, an SSD or the like. The storage section 202 stores a control program and address information of its own gateway 200 for the use in the communication by the first communication section 205 and the second communication section 206.

The notifying section 203 notifies a state of the gateway 200 in response to the signal from the control section 201. For example, the notifying section 203 is an LED or a speaker.

The I/F section 204 is connected with an input device such as a mouse or a keyboard and a display device such as a liquid crystal monitor. The connection may be wired connection or wireless connection. The wired connection is USB connection. The wireless connection is connection based on a wireless LAN or Bluetooth. In a case in which the input device is connected to the I/F section 204, the I/F section 204 transmits a signal input to the input device to the control section 201, and the control section 201 performs a processing in response to the input signal. In a case in which the display device is connected to the I/F section 204, the display device performs display in response to a signal from the control section 201.

The first communication section 205 is used to establish communication with any POS terminal connected through the wireless mesh network 400. The first communication section 205 transmits a predetermined packet to any POS terminal in response to the signal from the control section 201. The first communication section 205 transmits the data packet received from the POS terminal to the control section 201.

Based on the signal from the control section 201, one communication channel selected from a plurality of communication channels with different frequencies is set in the first communication section 205. The first communication section 205 does not transmit or receive a signal of a communication channel other than the set communication channel. The first communication section 205 supports the same wireless communication as the communication section 105 of the POS terminal 100 does. The first communication section 205 and the communication section 105 can communicate with each other if the communication channels are the same.

The second communication section 206 is connected to the network 300. For example, the second communication section 206 is an LTE communication interface. The second communication section 206 uploads predetermined data to a server connected to the network 300 in response to the signal from the control section 201. The second communication section 206 downloads data from the server connected to the network 300.

Next, operations since the POS terminal transmits the data packet to the gateway 200 until the POS terminal receives a response signal packet including an ACK (ACKnowledgemnt) corresponding to the data packet are described. The response signal packet is a reply to the data packet. The response signal packet indicates that the data packet has arrived at the gateway 200. The response signal packet is also referred to as a response signal.

FIG. 4 to FIG. 10 are diagrams illustrating transmission of the data packet and the response signal packet in the maintenance network system 1. Here, in the network configuration shown in FIG. 1, a case in which the POS terminal 100 transmits a data packet to the gateway 200 is described as an example. The case in which the gateway 200 returns the response signal back to the POS terminal 100 is described as an example. In this example, the POS terminal 100 is a transmission source of the data packet, but the transmission source of the data packet is not limited to the POS terminal 100.

Figure 4:
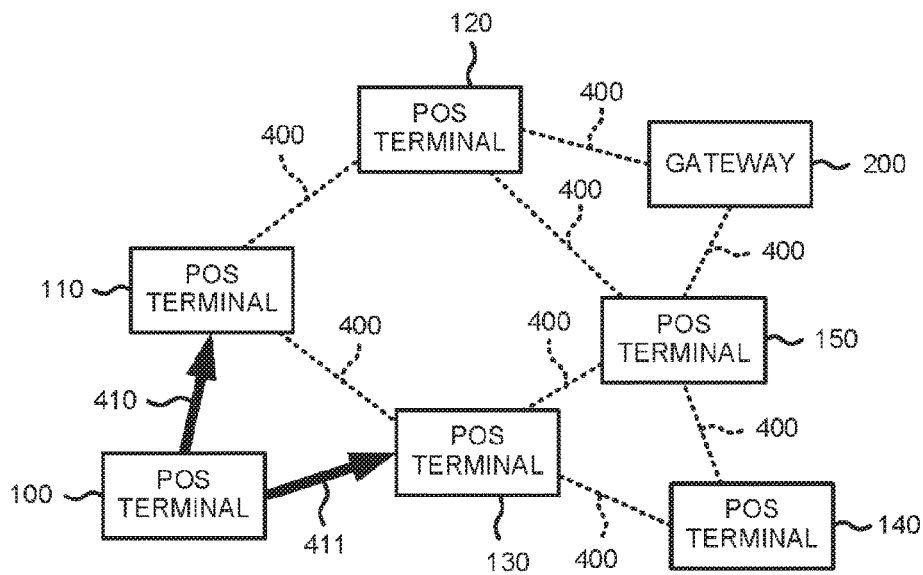
FIG. 4 is a diagram illustrating transmission of a data packet and a response signal packet in the maintenance network system according to the embodiment.

First, an operation of the POS terminal 100 is described with reference to FIG. 4.

FIG. 4(a) is a network diagram at the time the POS terminal 100 transmits a data packet through broadcast communication. An arrow 410 indicates that the data packet is transmitted from the POS terminal 100 to the POS terminal 110. Similarly, an arrow 411 indicates that the data packet is transmitted from the POS terminal 100 to the POS terminal 130.

FIG. 4(b) is a table showing addresses and communication channels of the POS terminals 100 to 150 and the gateway 200. An individual address is assigned to each of the POS terminals and the gateway 200.

A chA and a chB have mutually different frequencies. The chA has a frequency for communication of the data packet. The chA is also referred to as a first frequency channel. The chB has a frequency for communication of the response signal packet. The chB is also referred to as a second frequency channel.

Before the POS terminal 100 transmits the data packet through the broadcast communication, the communication channel of each of the POS terminals and the gateway 200 is set to the chA. The storage section 102 of each POS terminal and the storage section 202 of the gateway 200 store information relating to the chA and information relating to the chB in advance.

FIG. 4(c) shows a data packet transmitted from the POS terminal 100. It is assumed that the data packet is transmitted to the gateway 200 from the POS terminal 100. The data packet includes an area relating to a destination, an area relating to a transmission source, an area relating to a final destination, an area relating to data and an area relating to a transfer history.

The destination indicates a terminal that receives the data packet transmitted from the POS terminal 100 next. Since the POS terminal 100 transmits the data packet through the broadcast communication, the control section 101 stores "FFFF" indicating the broadcast communication in the area relating to the destination.

The transmission source indicates a terminal serving as a transmission source of the data packet. The control section 101 stores "0100" that is an address of its own POS terminal 100 in the area relating to the transmission source.

The final destination indicates a terminal at which the data packet transmitted from the POS terminal 100 finally arrives. The control section 101 stores "0200" that is an address of the gateway 200 in the area relating to the final destination.

The data may be any data that the POS terminal 100 transmits to the gateway 200 serving as the final destination. The control section 101 stores "Data" in the area relating to the data.

The transfer history indicates addresses of all terminals through which the data packet passes via multi-hop communication from the terminal serving as the transmission source to the terminal serving as the final destination. Since the POS terminal 100 is the transmission source, the control section 101 keeps the area relating to the transfer history empty.

As an example, the POS terminal 100 operates as follows.

As shown in FIG. 4(c), the control section 101 of the POS terminal 100 creates a data packet addressed to the gateway 200 that is different from its own POS terminal 100. The data packet addressed to the gateway 200 can also be referred to as a data packet of which the final destination is the gateway 200.

The communication channel of the communication section 105 of the POS terminal 100 is set to the chA. Therefore, as shown in FIG. 4(a), the communication section 105 of the POS terminal 100 transmits the data packet through the broadcast communication on the chA.

The data packet transmitted from the POS terminal 100 arrives at the POS terminal 110 and the POS terminal 130, which are adjacent to the POS terminal 100 and connected thereto through the wireless mesh network 400. The communication channel of the POS terminal 110 is set to the chA which is the same as that of the POS terminal 100, as shown in FIG. 4(b). Therefore, the POS terminal 110 receives the data packet transmitted from the POS terminal 100 through the broadcast communication on the chA (indicated by the arrow 410).

Similarly, the communication channel of the POS terminal 130 is set to the chA which is the same as that of the POS terminal 100, as shown in FIG. 4(b). Therefore, the POS terminal 130 receives the data packet transmitted from the POS terminal 100 through the broadcast communication on the chA (indicated by the arrow 411).

In the POS terminal 100, the control section 101 changes the communication channel of the communication section 105 from the chA to the chB after the data packet is transmitted on the chA by the communication section 105. Thus, the communication channel of the communication section 105 of the POS terminal 100 is set to the chB as shown in FIG. 4(b).

In the POS terminal 100, after the data packet is transmitted on the chA by the communication section 105, before the response signal packet arrives at the communication section 105, the control section 101 changes the communication channel of the communication section 105 from the chA to the chB. Such a change is made to prevent that the POS terminal 100 cannot receive the response signal packet.

For example, a time period since the POS terminal 100 transmits the data packet until the POS terminal 100 receives the response signal packet can be estimated as follows. According to the configuration of the wireless mesh network 400, the number of terminals through which the data packet passes from the POS terminal 100 to the gateway 200 can be estimated in advance. A transmission time of the data packet from the POS terminal 100 to the gateway 200 can be estimated based on the number of terminals through which the data packet passes. Similarly, a transmission time of the response signal packet from the gateway 200 to the POS terminal 100 can be estimated based on the number of terminals through which the response signal packet passes. In this way, a round-trip time of a packet between the POS terminal 100 and the gateway 200 can be estimated. In the POS terminal 100, the control section 101 needs to change the communication channel of the communication section 105 from the chA to the chB before the round-trip time elapses since the data packet is transmitted.

A timing at which the control section 101 of the POS terminal 100 changes the communication channel of the communication section 105 from the chA to the chB is not particularly limited as long as it is within the above range.

Figure 5:
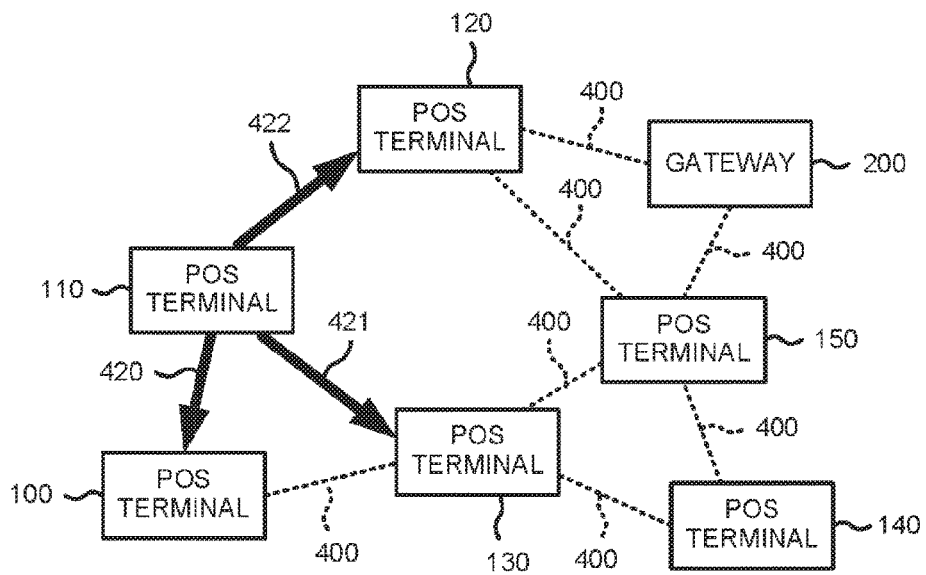
FIG. 5 is a diagram illustrating transmission of the data packet and the response signal packet in the maintenance network system according to the embodiment.

Next, an operation of the POS terminal 110 is described with reference to FIG. 5.

FIG. 5(a) is a network diagram at the time the POS terminal 110 transfers the data packet received from the POS terminal 100 through the broadcast communication. An arrow 420 indicates that the data packet is transmitted from the POS terminal 110 to the POS terminal 100. Similarly, an arrow 421 indicates that the data packet is transmitted from the POS terminal 110 to the POS terminal 130. Similarly, an arrow 422 indicates that the data packet is transmitted from the POS terminal 110 to the POS terminal 120.

FIG. 5(b) is a table showing addresses and the communication channels of the POS terminals 100 to 150 and the gateway 200.

FIG. 5(c) shows a data packet transmitted from the POS terminal 110 through the broadcast communication.

As an example, the POS terminal 110 operates as follows.

The communication section 105 of the POS terminal 110 receives the data packet transmitted from the POS terminal 100 through the broadcast communication on the chA. The control section 101 of the POS terminal 110 compares the address of its own POS terminal 110 with addresses of the destination and the final destination stored in the data packet. The addresses of the destination and the final destination are different from the address of the POS terminal 110. The control section 101 of the POS terminal 110 determines that the data packet is not addressed to its own POS terminal 110. A data packet addressed to its own POS terminal 110 can also be referred to as a data packet of which the final destination is its own POS terminal 110.

The control section 101 of the POS terminal 110 processes the data packet received from the POS terminal 100. As shown in FIG. 5(c), the control section 101 of the POS terminal 110 adds "0110", which is the address of its own POS terminal 110, to the area relating to the transfer history of the data packet. The data packet processed by the control section 101 of the POS terminal 110 is the same as the data packet that the POS terminal 110 receives from the POS terminal 100 except for the transfer history.

After the data packet addressed to the gateway 200 is received, the communication section 105 of the POS terminal 110 transmits the data packet to which the address of its own POS terminal 110 is added as described above. The communication channel of the communication section 105 of the POS terminal 110 is set to the chA. Therefore, as shown in FIG. 5(a), the communication section 105 of the POS terminal 110 transmits the data packet through the broadcast communication on the chA.

The data packet transmitted from the POS terminal 110 arrives at the POS terminal 100, the POS terminal 130 and the POS terminal 120, which are adjacent to the POS terminal 110 and connected thereto through the wireless mesh network 400

The communication channel of the POS terminal 100 is set to the chB different from that of the POS terminal 110. Therefore, the POS terminal 100 cannot receive the packet transmitted from the POS terminal 110 through the broadcast communication on the chA (indicated by the arrow 420).

The communication channel of the POS terminal 130 is set to the chA the same as that of the POS terminal 110. Therefore, the POS terminal 130 receives the packet transmitted from the POS terminal 110 through the broadcast communication on the chA (indicated by the arrow 421). The data packet that the POS terminal 130 receives from the POS terminal 110 is the same as the data packet that the POS terminal 130 receives from the POS terminal 100 except for the transfer history. Therefore, the POS terminal 130 may discard the data packet received from the POS terminal 110.

The communication channel of the POS terminal 120 is set to the chA the same as that of the POS terminal 110. Therefore, the POS terminal 120 receives the packet transmitted from the POS terminal 110 through the broadcast communication on the chA (indicated by the arrow 422).

In the POS terminal 110, the control section 101 changes the communication channel of the communication section 105 from the chA to the chB after the data packet is transmitted on the chA by the communication section 105.

Thus, the communication channel of the communication section 105 of the POS terminal 110 is set to the chB as shown in FIG. 5(b).

In the POS terminal 110, after the data packet is transmitted on the chA by the communication section 105, before the response signal packet arrives at the communication section 105, the control section 101 changes the communication channel of the communication section 105 from the chA to the chB. A timing at which the control section 101 of the POS terminal 110 changes the communication channel of the communication section 105 from the chA to the chB is not particularly limited as long as it is within the above range.

Figure 6:
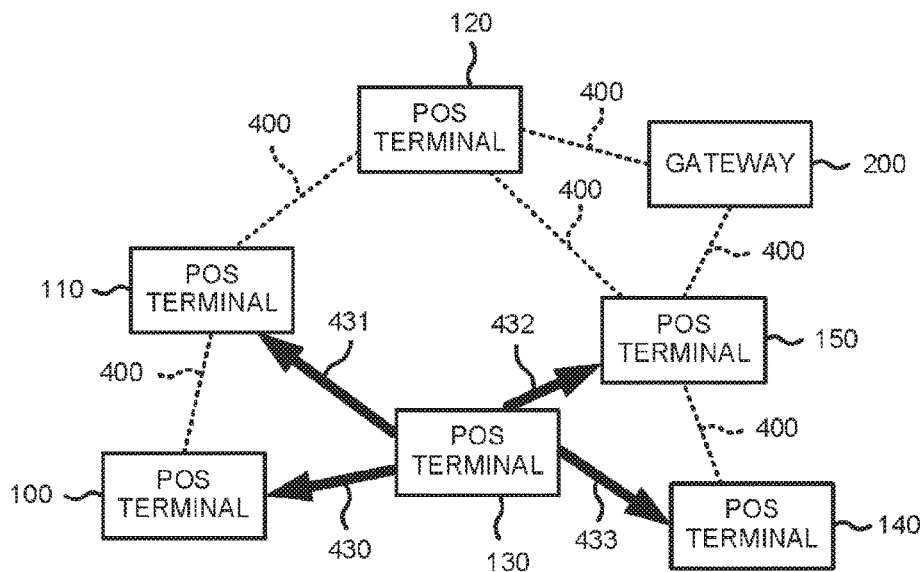
FIG. 6 is a diagram illustrating transmission of the data packet and the response signal packet in the maintenance network system according to the embodiment.

Next, the operation of the POS terminal 130 is described with reference to FIG. 6.

FIG. 6(a) is a network diagram at the time the POS terminal 130 transfers the data packet received from the POS terminal 100 through the broadcast communication. An arrow 430 indicates that the data packet is transmitted from the POS terminal 130 to the POS terminal 100. Similarly, an arrow 431 indicates that the data packet is transmitted from the POS terminal 130 to the POS terminal 110. An arrow 432 indicates that the data packet is transmitted from the POS terminal 130 to the POS terminal 150. An arrow 433 indicates that a data packet is transmitted from the POS terminal 130 to the POS terminal 140.

FIG. 6(b) is a table showing the addresses and the communication channels of the POS terminals 100 to 150 and the gateway 200.

FIG. 6(c) shows a data packet that the POS terminal 130 transmits through the broadcast communication.

As an example, the POS terminal 130 operates as follows.

The communication section 105 of the POS terminal 130 receives a data packet transmitted from the POS terminal 100 through the broadcast communication on the chA. The control section 101 of the POS terminal 130 determines that the data packet is not addressed to its own POS terminal 130, as with the POS terminal 110. As shown in FIG. 6(c), the control section 101 of the POS terminal 130 adds "0130", which is the address of its own POS terminal 130, to the area relating to the transfer history of the data packet. The data packet processed by the control section 101 of the POS terminal 130 is the same as the data packet that the POS terminal 130 receives from the POS terminal 100 except for the transfer history.

After the data packet addressed to the gateway 200 is received, the communication section 105 of the POS terminal 130 transmits the data packet to which the address of its own POS terminal 130 is added as described above. The communication channel of the communication section 105 of the POS terminal 130 is set to the chA. Therefore, as shown in FIG. 6(a), the communication section 105 of the POS terminal 130 transmits the data packet through the broadcast communication on chA, as with the POS terminal 110.

The data packet transmitted from the POS terminal 130 arrives at the POS terminal 100, the POS terminal 110, the POS terminal 140 and the POS terminal 150, which are adjacent to the POS terminal 130 and connected thereto through the wireless mesh network 400.

The communication channel of the POS terminal 100 is set to the chB different from that of the POS terminal 130. Therefore, the POS terminal 100 cannot receive the data packet transmitted from the POS terminal 130 through the broadcast communication on the chA (indicated by the arrow 430). The communication channel of the POS terminal 110 is set to the chB different from that of the POS terminal 130. Therefore, the POS terminal 110 cannot receive the data packet transmitted from the POS terminal 130 through the broadcast communication on the chA (indicated by the arrow 431).

The communication channel of the POS terminal 140 is set to the chA the same as that of the POS terminal 130. Therefore, the POS terminal 140 receives the data packet transmitted from the POS terminal 130 through the broadcast communication on the chA (indicated by the arrow 433). The communication channel of the POS terminal 150 is set to the chA the same as that of the POS terminal 130. Therefore, the POS terminal 150 receives the data packet transmitted from the POS terminal 130 through the broadcast communication on the chA (indicated by the arrow 432). The POS terminal 140 and the POS terminal 150 determine that the data packet is not addressed to its own terminal, and transfer the data packet in the same manner as described above. The operations of the POS terminal 140 and the POS terminal 150 are the same as those of the POS terminal 110 and the POS terminal 130 described above, and thus the description thereof is omitted.

In the POS terminal 130, the control section 101 changes the communication channel of the communication section 105 from the chA to the chB after the data packet is transmitted on the chA by the communication section 105. Thus, the communication channel of the communication section 105 of the POS terminal 130 is set to the chB as shown in FIG. 6(b). In the POS terminal 130, after the data packet is transmitted on the chA by the communication section 105, before the response signal packet arrives at the communication section 105, the control section 101 changes the communication channel of the communication section 105 from the chA to the chB.

Figure 7:
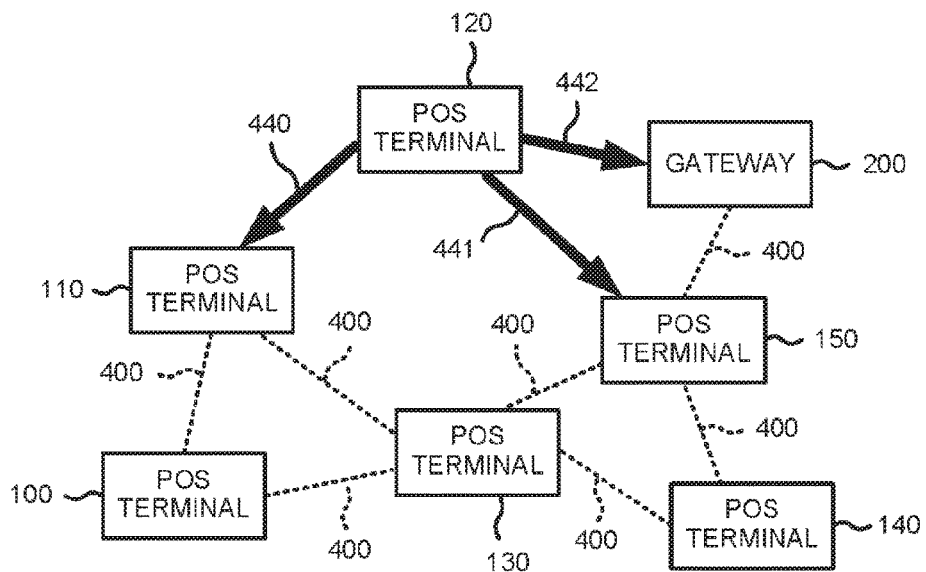
FIG. 7 is a diagram illustrating transmission of the data packet and the response signal packet in the maintenance network system according to the embodiment.

Next, operations of the POS terminal 120 and the gateway 200 are described with reference to FIG. 7.

FIG. 7(a) is a network diagram at the time the POS terminal 120 transfers the data packet received from the POS terminal 110 through the broadcast communication. An arrow 440 indicates that the data packet is transmitted from the POS terminal 120 to the POS terminal 110. Similarly, an arrow 441 indicates that the data packet is transmitted from the POS terminal 120 to the POS terminal 150. An arrow 442 indicates that the data packet is transmitted from the POS terminal 120 to the gateway 200.

FIG. 7(b) is a table showing the addresses and the communication channels of the POS terminals 100 to 150 and the gateway 200.

FIG. 7(c) shows a data packet that the POS terminal 120 transmits through the broadcast communication.

As an example, the POS terminal 120 operates as follows.

The communication section 105 of the POS terminal 120 receives the data packet transmitted from the POS terminal 110 through the broadcast communication on the chA. The control section 101 of the POS terminal 120 determines that the data packet is not addressed to its own POS terminal 120, as with the POS terminal 110. As shown in FIG. 7(c), the control section 101 of the POS terminal 120 adds "0120" that is the address of its own POS terminal 120 to the area relating to the transfer history of the data packet. Therefore, in the area relating to the transfer history of the data packet, the addresses "0110" and "0120" are stored in a transfer order.

After the data packet addressed to the gateway 200 is received, the communication section 105 of the POS terminal 120 transmits the data packet to which the address of its own POS terminal 120 is added as described above. The communication channel of the communication section 105 of the POS terminal 120 is set to the chA. Therefore, as shown in FIG. 7(a), the communication section 105 of the POS terminal 120 transmits the data packet through the broadcast communication on the chA, as with the POS terminal 110.

The data packet transmitted from the POS terminal 120 arrives at the POS terminal 110, the POS terminal 150 and the gateway 200, which are adjacent to the POS terminal 120 and connected thereto through the wireless mesh network 400.

The communication channel of the POS terminal 110 is set to the chB different from that of the POS terminal 120. Therefore, the POS terminal 110 cannot receive the data packet transmitted from the POS terminal 120 through the broadcast communication on the chA (indicated by the arrow 440).

The communication channel of the POS terminal 150 is set to the chA the same as that of the POS terminal 120. Therefore, the POS terminal 150 receives the data packet transmitted from the POS terminal 120 through the broadcast communication on the chA (indicated by the arrow 441). The POS terminal 150 determines that the data packet is not addressed to its own POS terminal 150, and then transfers the data packet.

The communication channel of the gateway 200 is set to the chA the same as the POS terminal 120. Therefore, the gateway 200 receives the data packet transmitted from the POS terminal 120 through the broadcast communication on the chA (indicated by the arrow 442).

In the POS terminal 120, the control section 101 changes the communication channel of the communication section 105 from the chA to the chB after the data packet is transmitted on the chA by the communication section 105. In this way, the communication channel of the communication section 105 of the POS terminal 120 is set to the chB, as shown in FIG. 7(b). In the POS terminal 120, after the data packet is transmitted on the chA by the communication section 105, before the response signal packet arrives at the communication section 105, the control section 101 changes the communication channel of the communication section 105 from the chA to the chB.

As an example, the gateway 200 operates as follows.

The first communication section 205 receives the data packet transmitted from the POS terminal 120 through the broadcast communication on the chA. The control section 201 compares the addresses of the destination and the final destination stored in the data packet with the address of its own gateway 200. The address of the final destination and the address of the gateway 200 are the same. The control section 201 determines that the data packet from the POS terminal 120 is addressed to its own gateway 200.

The control section 201 changes the communication channel of the first communication section 205 from the chA to the chB after the data packet addressed to its own gateway 200 is received by the first communication section 205. In this way, the communication channel of the first communication section 205 of the gateway 200 is set to the chB, as shown in FIG. 7(b).

The control section 201 can upload the maintenance information included in the data packet created by the POS terminal 100 to the network 300 via the second communication section 206.

Figure 8:
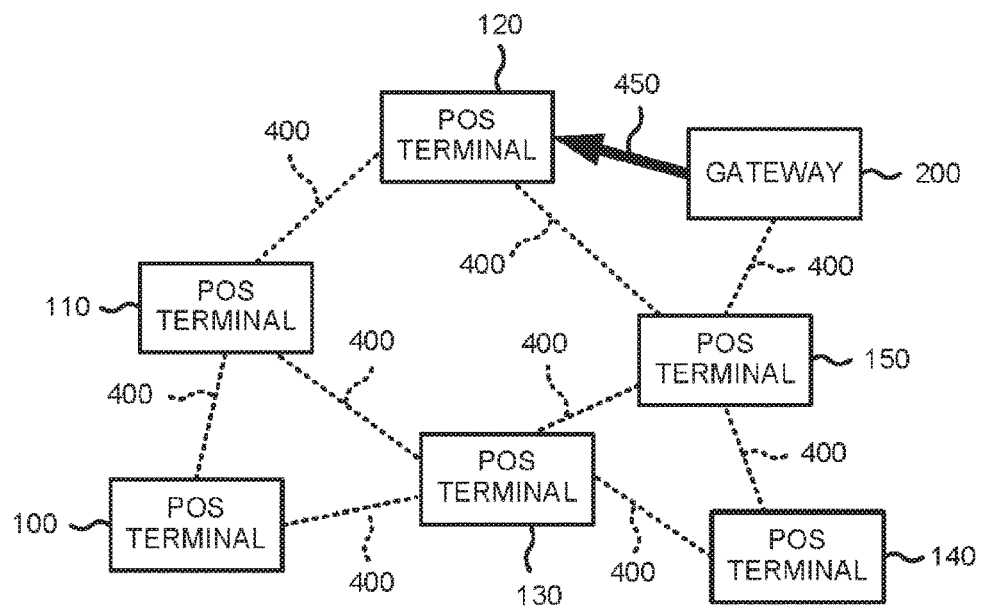
FIG. 8 is a diagram illustrating transmission of the data packet and the response signal packet in the maintenance network system according to the embodiment.

Next, the operation of the gateway 200 is described with reference to FIG. 8.

FIG. 8(a) is a network diagram at the time the gateway 200 transmits the response signal packet through unicast communication. An arrow 450 indicates that the response signal packet is transmitted from the gateway 200 to the POS terminal 120.

FIG. 8(b) is a table showing the addresses and the communication channels of the POS terminals 100 to 150 and the gateway 200.

FIG. 8(c) shows a response signal packet that the gateway 200 transmits to the POS terminal 120 through the unicast communication. It is assumed that contrary to the data packet, the response signal packet is addressed to the POS terminal 100 from the gateway 200. The response signal packet includes an area relating to a destination, an area relating to a transmission source, an area relating to data and an area relating to transfer information.

The destination indicates a terminal that receives the response signal packet transmitted from the gateway 200 next. Here, the gateway 200 returns the response signal packet in a reverse order with respect to a path of the data packet. The control section 201 refers to addresses in the transfer history stored in the data packet. The control section 201 determines that the gateway 200 receives the data packet from the POS terminal 120. The control section 201 stores "0120", which is the address of the POS terminal 120, in the area relating to the destination.

The transmission source indicates a terminal serving as a transmission source of the response signal packet. The control section 201 stores "0200" which is the address of its own gateway 200 in the area relating to the transmission source.

The data is a response to the data packet from the gateway 200 to the POS terminal 100. The control section 201 stores "ACK" in the area relating to the data.

The transfer information indicates addresses of all terminals that transmit or receive the response signal packet from the gateway 200 to the POS terminal 100. The control section 201 refers to the addresses of the transmission source, the final destination and the transfer history stored in the data packet to grasp the path from the POS terminal 100 to the gateway 200. The control section 201 creates the transfer information for returning the response signal packet from the gateway 200 to the POS terminal 100.

Typically, the control section 201 arranges the addresses in the transfer history arranged in the transfer order stored in the data packet in a reverse order. In this example, the control section 201 stores "0200", "0120", "0110" and "0100" in order in the area relating to the transfer information. The POS terminal 100 is a final destination of the response signal packet.

As an example, the gateway 200 operates as follows.

As shown in FIG. 8(c), the control section 201 creates the response signal packet addressed to the POS terminal 100 different from its own gateway 200. The response signal packet addressed to the POS terminal 100 can also be referred to as a data packet of which the final destination is the POS terminal 100.

The communication channel of the first communication section 205 is set to the chB. Therefore, the first communication section 205 transmits the response signal packet addressed to the POS terminal 100 after the communication channel thereof is changed from the chA to the chB. As shown in FIG. 8(a), the first communication section 205 transmits the response signal packet to the POS terminal 120 through the unicast communication on the chB.

The response signal packet transmitted from the gateway 200 arrives at the POS terminal 120. The communication channel of the POS terminal 120 is set to the chB the same as that of the gateway 200, as shown in FIG. 8(b). Therefore, the POS terminal 120 receives the response signal packet transmitted from the gateway 200 through the unicast communication on the chB (indicated by the arrow 450).

The control section 201 changes the communication channel of the first communication section 205 from the chB to the chA after the response signal packet is transmitted on the chB by the first communication section 205. In this way, the communication channel of the first communication section 205 is set to the chA, as shown in FIG. 8(b).

Figure 9:
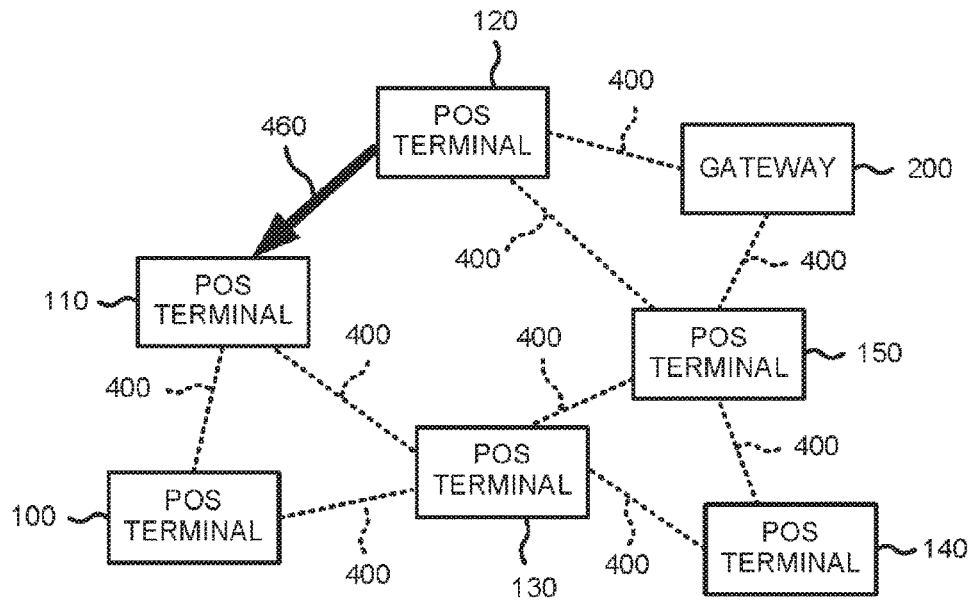
FIG. 9 is a diagram illustrating transmission of the data packet and the response signal packet in the maintenance network system according to the embodiment.

Next, the operation of the POS terminal 120 is described with reference to FIG. 9.

FIG. 9(a) is a network diagram at the time the POS terminal 120 transfers the response signal packet through the unicast communication. An arrow 460 indicates that the response signal packet is transmitted from the POS terminal 120 to the POS terminal 110.

FIG. 9(b) is a table showing the addresses and the communication channels of the POS terminals 100 to 150 and the gateway 200.

FIG. 9(c) shows a response signal packet that the POS terminal 120 transmits to the POS terminal 110 through the unicast communication.

As an example, the POS terminal 120 operates as follows.

The communication section 105 of the POS terminal 120 receives the response signal packet transmitted from the gateway 200 through the unicast communication on the chB. The control section 101 of the POS terminal 120 refers to the addresses in the transfer information stored in the response signal packet, and determines that the address of the final destination of the response signal packet is "0100". In this way, the control section 101 of the POS terminal 120 determines that the response signal packet is not addressed to its own POS terminal 120. The response signal packet addressed to its own POS terminal 120 can also be referred to as a response signal packet of which the final destination is its own POS terminal 120. The control section 101 of the POS terminal 120 refers to the addresses in the transfer information stored in the response signal packet, and determines that the address of a next transfer destination of the response signal packet is "0110".

The control section 101 of the POS terminal 120 processes the response signal packet received from the gateway 200. As shown in FIG. 9(c), the control section 101 of the POS terminal 120 stores "0110" that is the address of the POS terminal 110 in the area relating to the destination. As shown in FIG. 9(c), the control section 101 of the POS terminal 120 stores "0120" that is the address of its own POS terminal 120 in the area relating to the transmission source. The response signal packet processed by the POS terminal 120 is the same as the response signal packet received by the POS terminal 120 from the gateway 200 except for the destination and the transmission source.

The communication section 105 of the POS terminal 120 transmits the response signal packet processed as described above after the response signal packet addressed to the POS terminal 100 is received. The communication channel of the communication section 105 of the POS terminal 120 is set to the chB. Therefore, the communication section 105 of the POS terminal 120 transmits the response signal packet to the POS terminal 110 through the unicast communication on the chB.

The response signal packet transmitted from the POS terminal 120 arrives at the POS terminal 110. The communication channel of the POS terminal 110 is set to the chB the same as that of the POS terminal 120, as shown in FIG. 9(b). Therefore, the POS terminal 110 receives the response signal packet transmitted from the POS terminal 120 through the unicast communication on the chB (indicated by the arrow 460).

The control section 101 of the POS terminal 120 changes the communication channel of the communication section 105 from the chB to the chA after the response signal packet is transmitted on the chB by the communication section 105. In this way, the communication channel of the communication section 105 of the POS terminal 120 is set to the chA, as shown in FIG. 9(b).

Figure 10:
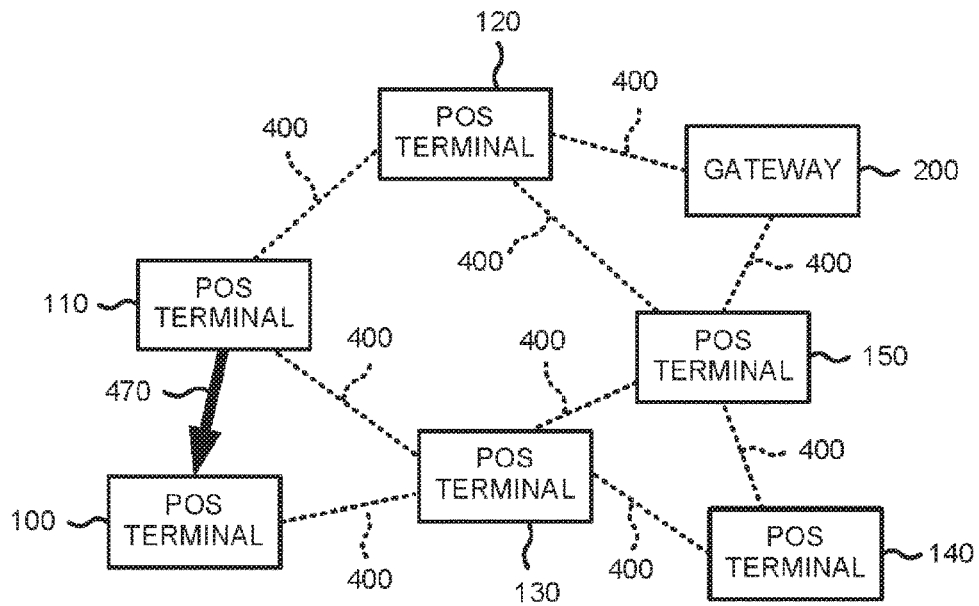
FIG. 10 is a diagram illustrating transmission of the data packet and the response signal packet in the maintenance network system according to the embodiment.

Next, operations of the POS terminal 110 and the POS terminal 100 are described with reference to FIG. 10.

FIG. 10(a) is a network diagram at the time the POS terminal 110 transfers the response signal packet through the unicast communication. An arrow 470 indicates that the response signal packet is transmitted from the POS terminal 110 to the POS terminal 100.

FIG. 10(b) is a table showing the addresses and the communication channels of the POS terminals 100 to 150 and the gateway 200.

FIG. 10(c) shows the response signal packet that the POS terminal 110 transmits to the POS terminal 100 through the unicast communication.

As an example, the POS terminal 110 operates as follows.

The communication section 105 of the POS terminal 110 receives the response signal packet transmitted from the POS terminal 120 through the unicast communication on the chB. The control section 101 of the POS terminal 110 refers to the addresses in the transfer information stored in the response signal packet, and determines that the address of the final destination of the response signal packet is "0100". In this way, the control section 101 of the POS terminal 110 determines that the response signal packet is not addressed to its own POS terminal 110. The control section 101 of the POS terminal 110 refers to the addresses in the transfer information stored in the response signal packet, and determines that the address of a next transfer destination of the response signal packet is "0100".

The control section 101 of the POS terminal 110 processes the response signal packet received from the POS terminal 120. As shown in FIG. 10(c), the control section 101 of the POS terminal 110 stores "0100" that is the address of the POS terminal 100 in the area relating to the destination. As shown in FIG. 10(c), the control section 101 of the POS terminal 110 stores "0110" that is the address of its own POS terminal 110 in the area relating to the transmission source. The response signal packet processed by the POS terminal 110 is the same as the response signal packet that the POS terminal 110 receives from the POS terminal 120 except for the destination and the transmission source.

The communication section 105 of the POS terminal 110 transmits the response signal packet processed as described above after the response signal packet addressed to the POS terminal 100 is received. The communication channel of the communication section 105 of the POS terminal 110 is set to the chB. Therefore, the communication section 105 of the POS terminal 110 transmits the response signal packet to the POS terminal 100 through the unicast communication on the chB.

The response signal packet transmitted from the POS terminal 110 arrives at the POS terminal 100. The communication channel of the POS terminal 100 is set to the chB the same as that of the POS terminal 110, as shown in FIG. 10(b). Therefore, the POS terminal 100 receives the response signal packet transmitted through the unicast communication on the chB from the POS terminal 110 (indicated by the arrow 470).

The control section 101 of the POS terminal 110 changes the communication channel of the communication section 105 from the chB to the chA after the response signal packet is transmitted on the chB by the communication section 105. In this way, the communication channel of the communication section 105 of the POS terminal 110 is set to the chA, as shown in FIG. 10(b).

As an example, the POS terminal 100 operates as follows.

The communication section 105 of the POS terminal 100 receives the response signal packet transmitted from the POS terminal 110 through the unicast communication on the chB. The control section 101 of the POS terminal 100 refers to the addresses in the transfer information stored in the response signal packet. The control section 101 of the POS terminal 100 determines that the address of the final destination of the response signal packet is the address of its own POS terminal 100. Thus, the control section 101 of the POS terminal 100 determines that the response signal packet created by the gateway 200 is the response signal packet addressed to its own POS terminal 100.

The control section 101 of the POS terminal 100 changes the communication channel of the communication section 105 from the chB to the chA after the response signal packet addressed to its own POS terminal 100 is received by the communication section 105. In this way, the communication channel of the communication section 105 of the POS terminal 100 is set to the chA as shown in FIG. 10(b).

The POS terminal 100 can confirm that the data packet including the maintenance information has arrived at the gateway 200 by receiving the response signal packet addressed to its own POS terminal 100.

The POS terminal 130 does not receive the response signal packet. Therefore, the communication channel of the communication section 105 of the POS terminal 130 remains to be chB, as shown in FIG. 10(b). The control section 101 of the POS terminal 130 changes the communication channel of the communication section 105 from the chB to the chA before the response signal packet is received by the communication section 105 and after a predetermined period of time elapses since the data packet is transmitted on the chA by the communication section 105. The same is applicable to other POS terminals.

For example, a time until the communication channel is changed from the chB to the chA may be twice the time taken to transmit the data packet from the POS terminal farthest from the gateway 200 to the gateway 200. The time until the communication channel is changed from the chB to the chA may be twice the time required for transfer of a limited number of times if the number of times of transfer through the broadcast transmission is limited.

In this way, the POS terminal 130 does not continuously wait for the response signal packet for a long time unnecessarily, and can prepare for reception of a next data packet.

According to the present embodiment, the POS terminal transmits (transfers) the data packet addressed to a terminal different from its own POS terminal through the broadcast communication on the chA.

In this way, the POS terminal can transmit the data packet to the target terminal.

Furthermore, the POS terminal changes the communication channel of the communication section 105 thereof from the chA to the chB after the data packet is transmitted (transferred).

In this way, it can be prevented that the POS terminal unnecessarily receives another data packet after transmitting the data packet. Therefore, the POS terminal does not continuously transmit another data packet through the broadcast communication after transmitting the data packet. As a result, the POS terminal can prevent the response signal packet addressed to the transmission source terminal from being disturbed by the transmission of the data packet through the broadcast communication.

Furthermore, after transmitting (transferring) the data packet on the chA, the POS terminal changes the communication channel of the communication section 105 from the chA to the chB before the response signal packet arrives.

In this way, it can be prevented that the POS terminal cannot receive the response signal packet.

Furthermore, the POS terminal transmits (transfers) the response signal packet through the unicast communication on the chB.

In this way, the POS terminal can return the response signal packet indicating that the maintenance information has arrived back to the POS terminal serving as a transmission source of the data packet including the maintenance information. Since the response signal packet is transmitted through the unicast communication instead of the broadcast communication, the POS terminal can prevent unnecessary transmission of the response signal packet. Since the response signal packet is transmitted on the chB different from the chA, the POS terminal can prevent collision occurring in the data packet and the response signal packet through the broadcast communication. As a result, the POS terminal can prevent the response signal packet addressed to the transmission source terminal from being disturbed by the transmission of the data packet through the broadcast communication.

Furthermore, the POS terminal changes the communication channel of the communication section 105 from the chB to the chA after the response signal packet is transmitted (transferred).

In this way, the POS terminal can prepare for reception of the next data packet. For example, at the time another POS terminal newly transmits a data packet including the maintenance information etc., the POS terminal can transmit the data packet after receiving the data packet.

Furthermore, the POS terminal of the data packet transmission source changes the communication channel of the communication section 105 from chB to chA in response to the reception of the response signal packet through the unicast communication.

In this way, the POS terminal can prepare for reception of the next data packet. For example, when another POS terminal newly transmits a data packet including the maintenance information etc., the POS terminal can transmit the data packet after receiving the data packet.

Furthermore, the POS terminal changes the communication channel of the communication section 105 from the chB to the chA before the response signal packet is received and after a predetermined time elapses since the data packet is transmitted on the chA.

In this way, the POS terminal can prepare for reception of the next data packet because the POS terminal does not continuously wait for the response signal packet for a long time unnecessarily. For example, at the time another POS terminal newly transmits a data packet including the maintenance information etc., the POS terminal can transmit the data packet after receiving the data packet.

Furthermore, at the time of transferring the data packet through the broadcast communication, the POS terminal stores the address of its own POS terminal in the area relating to the transfer history of the data packet.

In this way, the gateway 200 can grasp the path of the data packet based on the transfer history. The gateway 200 can create a path (transfer information) for transmitting the response signal packet.

Furthermore, the gateway 200 changes the communication channel of the first communication section 205 from the chA to the chB after the data packet addressed to its own gateway 200 is received.

In this way, the gateway 200 can prevent unnecessary reception after the data packet is received.

Furthermore, after the response signal packet is transmitted on the chB, the gateway 200 changes the communication channel of the first communication section 205 from the chB to the chA.

In this way, the gateway 200 transmits the response signal packet on the chB different from the chA, and thus, the collision occurring in the data packet and the response signal packet through the broadcast communication can be prevented. As a result, the gateway 200 can prevent that the response signal packet addressed to the transmission source terminal is disturbed by the transmission of the data packet through the broadcast communication. The gateway 200 can prepare for reception of the next data packet. For example, at the time the POS terminal newly transmits a data packet including the maintenance information etc., the gateway 200 can receive the data packet.

A modification of the present embodiment is described below.

In the present embodiment, the frequency channel for communication of the response signal packet is stored in the storage section 102 and the storage section 202, but it is not limited thereto. The frequency channel for communication of the response signal packet may be designated by the POS terminal serving as the transmission source of the data packet.

FIG. 11 is a diagram illustrating a configuration of a data packet according to the modification.

The data packet further includes an area relating to a channel.

The area relating to the channel stores information for designating the communication channel of the response signal packet. For example, in the POS terminal serving as the transmission source of the data packet, the control section 101 adds information indicating that the communication channel of the response signal packet is the chB to the data packet. The communication section 105 transmits a data packet to which the information indicating that the communication channel of the response signal packet is the chB is added.

In the POS terminal receiving the data packet, the control section 101 refers to the data packet and uses the communication channel of the response signal packet. For example, the control section 101 uses the chB as the communication channel of the response signal packet. The same is applicable to the gateway 200 receiving the data packet.

In this way, the frequency channel for communication of the response signal packet is not fixed in advance, and can be appropriately changed and used according to surrounding environment.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A wireless communication device constituting a portion of a wireless mesh network that transmits information through a multi-hop communication, comprising:
    a processor; and
    a memory that stores instructions that, when executed by the processor, facilitates performance of operations, comprising:
    transmitting a message addressed to another wireless communication device through a broadcast communication on a first frequency channel;
    changing a communication channel from the first frequency channel to a second frequency channel for communication of a response signal responding to the message after transmitting the message,
    wherein in response to receiving the response signal, the response signal is transmitted to another wireless communication device through a unicast communication on the second frequency channel, and
    wherein the communication channel is changed from the second frequency channel to the first frequency channel after the response signal is transmitted; and
    wherein the operations further comprise:
        adding information indicating that the communication channel of the response signal is the second frequency channel to the message, and
        transmitting the message to which the information has been added.

2. The wireless communication device according to claim 1, wherein the operations further comprise
    changing the communication channel from the first frequency channel to the second frequency channel before arrival of the response signal and after the message has been transmitted on the first frequency channel.

3. The wireless communication device according to claim 1, wherein
    the wireless communication device is a POS terminal.

4. The wireless communication device according to claim 1, wherein
    the another wireless communication device is a POS terminal.

5. The wireless communication device according to claim 1, wherein
    the another wireless communication device is a gateway configured to communicate with another network.

6. The wireless communication device according to claim 1, wherein
    the message comprises maintenance information.

7. A wireless communication device constituting a portion of a wireless mesh network that transmits information through a multi-hop communication, comprising:
    a processor; and
    a memory that stores instructions that, when executed by the processor, facilitates performance of operations, comprising:
    receiving a message addressed to the wireless communication device and transmitting a response signal responding to the message; and
    changing a communication channel from a first frequency channel for communication of the message to a second frequency channel for communication of the response signal after the message has been received, and changing the communication channel from the second frequency channel to the first frequency channel after the response signal has been transmitted on the second frequency channel, wherein in response to receiving the response signal, transmitting the response signal to another wireless communication device through a unicast communication on the second frequency channel, and wherein the operations further comprise:

adding information indicating that the communication channel of the response signal is the second frequency channel to the message; and transmitting the message to which the information has been added.

8. The wireless communication device according to claim 7, wherein the wireless communication device is a POS terminal.

9. The wireless communication device according to claim 7, wherein the another wireless communication device is a POS terminal.

10. The wireless communication device according to claim 7, wherein the another wireless communication device is a gateway configured to communicate with another network.

11. The wireless communication device according to claim 7, wherein the message comprises maintenance information.

12. A wireless mesh network that transmits information through a multi-hop communication, comprising:

a gateway configured to communicate to another network outside of the wireless mesh network; and a plurality of wireless communication devices, at least one wireless communication device in communication with the gateway, and each wireless communication device in communication with at least one other wireless communication device, each wireless communication device comprising:

a processor; and a memory that stores instructions that, when executed by the processor, facilitates performance of operations, comprising:

transmitting a message addressed to another wireless communication device through a broadcast communication on a first frequency channel; and changing a communication channel from the first frequency channel to a second frequency channel for communication of a response signal that is a response to the message after the message has been transmitted, wherein the operations further comprise:

receiving the response signal, and transmitting the response signal to another wireless communication device through a unicast communication on the second frequency channel;

changing the communication channel from the second frequency channel to the first frequency channel after the response signal has been transmitted;

adding information indicating that the communication channel of the response signal is the second frequency channel to the message; and transmitting the message to which the information has been added.

13. The wireless mesh network according to claim 12, wherein the operations further comprise changing the communication channel from the first frequency channel to the second frequency channel before arrival of the response signal and after the message is transmitted on the first frequency channel.

* * * * *